US011097977B2

(12) United States Patent
Vockler et al.

(10) Patent No.: US 11,097,977 B2
(45) Date of Patent: Aug. 24, 2021

(54) DIGITAL INK

(71) Applicant: Industrial Control Development, Inc., Ridgefield, WA (US)

(72) Inventors: Larry Vockler, Vancouver, WA (US); John W. Swanson, Lake Oswego, OR (US)

(73) Assignee: Industrial Control Development, Inc., Ridgefield, WA (US)

( * ) Notice: Subject to any disclaimer, the term of this patent is extended or adjusted under 35 U.S.C. 154(b) by 437 days.

(21) Appl. No.: 15/170,802

(22) Filed: Jun. 1, 2016

(65) Prior Publication Data

US 2017/0349480 A1 Dec. 7, 2017

(51) Int. Cl.
| | |
|---|---|
| *C03C 8/16* | (2006.01) |
| *C03C 17/22* | (2006.01) |
| *C03C 17/02* | (2006.01) |
| *C03C 17/00* | (2006.01) |
| *B41J 2/21* | (2006.01) |
| *B41J 2/01* | (2006.01) |

(52) U.S. Cl.
CPC ............... *C03C 8/16* (2013.01); *B41J 2/01* (2013.01); *B41J 2/2107* (2013.01); *B41J 2/2114* (2013.01); *C03C 17/007* (2013.01); *C03C 17/02* (2013.01); *C03C 17/22* (2013.01); *C03C 2217/45* (2013.01); *C03C 2217/452* (2013.01); *C03C 2217/475* (2013.01); *C03C 2218/119* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2202/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218; C03C 8/16; C03C 17/22; C03C 17/02; C03C 17/007; C03C 2217/45; C03C 2217/475; C03C 2217/452; C03C 2218/119
See application file for complete search history.

(56) References Cited

U.S. PATENT DOCUMENTS

| | | | | |
|---|---|---|---|---|
| 5,330,794 A | * | 7/1994 | Bosco | C04B 12/04 427/387 |
| 5,466,280 A | * | 11/1995 | Lee | C04B 28/26 106/14.12 |
| 5,510,188 A | * | 4/1996 | Vockler | C03C 17/007 106/600 |
| 8,783,829 B2 | | 7/2014 | Ohzeki et al. | |
| 2002/0017217 A1 | * | 2/2002 | Mizukawa | C09D 11/037 106/31.47 |
| 2003/0116054 A1 | * | 6/2003 | John | C09D 5/18 106/18.12 |
| 2006/0052477 A1 | * | 3/2006 | Kessel | C09D 11/101 522/184 |
| 2006/0139425 A1 | * | 6/2006 | Tsuchimura | B41C 1/003 347/100 |
| 2006/0162884 A1 | | 7/2006 | Gane et al. | |
| 2006/0166014 A1 | * | 7/2006 | Klotz | C23C 24/08 428/469 |
| 2007/0022547 A1 | * | 2/2007 | O'Brien | C07K 7/06 8/406 |
| 2011/0057986 A1 | * | 3/2011 | Ikoshi | B41J 2/2107 347/21 |
| 2013/0020335 A1 | | 1/2013 | Schmidt et al. | |
| 2014/0127514 A1 | | 5/2014 | Inoue et al. | |

FOREIGN PATENT DOCUMENTS

EP 2366746 A1 9/2011

OTHER PUBLICATIONS

Digital Spray Printing Brochure; Selected BEMACID/BEMAPLEX dyes; BEZEMAAG. Date: May 2012; pp. 1-11.*

* cited by examiner

*Primary Examiner* — Manish S Shah
(74) *Attorney, Agent, or Firm* — Klarquist Sparkman, LLP

(57) ABSTRACT

A method including digital printing a heat curable aqueous composition onto a substrate, wherein the composition includes: (a) at least one water soluble synthetic alkali metal silicate; and (b)(i) at least one pigment or (b)(ii) at least one additive selected from aluminum oxide, ceramic microspheres, recycled ground glass, or calcium carbonate; wherein the composition is substantially free of any organic solvent; and heating the composition bearing substrate thereby curing the composition, and wherein the substrate includes a material selected from glass, ceramic, textile, polymeric, metal, wood, or a combination thereof.

30 Claims, No Drawings

DIGITAL INK

BACKGROUND

Frit-based digital inks include colored frit particles and some volatile organic solvents (VOCs). Frit-based digital inks provide fragile coatings that can be easily damaged until the frit is fused to the glass substrate at high temperatures in the range of 600 to 700° C. Therefore there exist a need for a more "green" water based ink with no VOC that is less fragile than frit-based inks once dried but prior to oven cure, and can be cured at high temperatures as well as much lower temperatures to offer additional cost savings.

SUMMARY

Disclosed herein is a method comprising:

digital printing a heat curable aqueous composition onto a substrate, wherein the composition comprises:

(a) at least one water soluble synthetic alkali metal silicate;

and (b)(i) at least one pigment or (b)(ii) at least one additive selected from aluminum oxide, ceramic microspheres, recycled ground glass, or calcium carbonate; and wherein the substrate comprises a material selected from glass, ceramic, textile, polymeric, metal, wood, or a combination thereof.

Further disclosed herein is a method comprising:

ejecting a composition from a piezo printing head and onto a substrate, wherein the composition comprises (a) at least one water soluble synthetic alkali metal silicate; and (b)(i) at least one pigment or (b)(ii) at least one additive selected from aluminum oxide, ceramic microspheres, recycled ground glass, or calcium carbonate; and wherein the substrate comprises a material selected from glass, ceramic, textile, polymeric, metal, wood, or a combination thereof.

Also disclosed herein is a heat curable aqueous composition comprising:

(a) 15 to 75 wt % of at least one water soluble synthetic alkali metal silicate, based on the total weight of the aqueous composition;

(b)(i) 1 to 50 wt % of at least one pigment, based on the total weight of the aqueous composition or (b)(ii) 1 to 50 wt % of at least one additive selected from aluminum oxide, ceramic microspheres, recycled ground glass, or calcium carbonate;

(c) at least one least one alkali metal hydroxide, alkaline-earth metal hydroxide, or a combination thereof; and (d) at least one surfactant, wherein the composition has a viscosity of less than or equal to 300 cP, as measured on a Brookfield RVDV-11+PX viscometer using spindle 00S at 100 rpm.

The foregoing will become more apparent from the following detailed description

DETAILED DESCRIPTION

Disclosed herein are silicate-containing inks for printing images or coatings on substrates such as glass, ceramic, textile, polymeric, metal, wood, and combinations thereof. The inks are particularly useful for applying to glass and ceramic substrates. The silicate-containing inks disclosed herein are heat curable aqueous compositions that have the advantages of no VOCs, higher opacity, and cost savings compared to current glass frit-based coatings.

The ink compositions disclosed herein are particularly useful for digital printing. By "digital printing" is meant a digitally controlled ejection or application of the composition that is used to position (ink) colorants in pre-defined patterns onto a surface. In certain embodiments, the composition may be a fluid that is ejected in the form of drops. In certain embodiments, the process involves circulating the composition within at least one piezo print head, and printing a digital image with at least one piezo print head by applying drops of the composition onto the substrate.

The ink compositions include at least one water soluble synthetic alkali metal silicate salt. In certain embodiments, the silicate(s) is sodium silicate ($Na_2SiO_3$), lithium silicate ($Li_2SiO_3$), potassium silicate ($K_2SiO_3$), or a mixture thereof. In certain embodiments, the only silicate present is lithium silicate. In certain embodiments, the only silicate present is potassium silicate. In certain embodiments, both lithium silicate and sodium silicate are included in the composition. In certain embodiments, both lithium silicate and potassium silicate are included in the composition.

In certain embodiments the composition optionally include at least one additive (e.g., a curing agent) that may, in certain embodiments, lower the cure temperature of the silicate to, for example, 170° C. As the pH is lowered to a more neutralized pH region, the soluble silicate will gel and polymerize reacting with soluble metals to produce insoluble metal silicates or metal silicate gels. Calcium chloride or zinc chloride can react with sodium silicate resulting in a hydrated calcium or zinc silicate. Other materials include calcium hydroxide, bicarbonates, zinc carbonate, carbon dioxide, calcium oxide and phosphates. Organic curing or setting agents include ethyl acetate, dibasic ester, monoacetin and Triacetin. Metal oxides will also provide curing such as zinc oxide.

The compositions further include at least one pigment. In certain embodiments, the pigment is a mixed metal oxide. Mixed metal oxide pigments are compounds comprised of a group of two or more metals and oxygen. The most common crystal structures are rutile ($MeO_2$) hematite ($Me_2O_3$) or spinel ($Me_3O_4$). Metals commonly present include: cobalt, iron, trivalent chrome, tin, antimony, titanium, manganese and aluminum. Illustrative mixed metal oxide pigments include the following:

| Color | Pigment | C.I. Pigment | CAS # | Manufacturer | Pigment type |
|---|---|---|---|---|---|
| Black | Nubifer NB-5970 | | | Nubiola/Ferro | iron oxides |
| Black | Monarch 1000 | | | Cabot | carbon black |
| Black | 303T | Bayferrox ® 303 T | 68186-94-7 | | iron and manganese oxide (Fe, Mn)$_2$O$_3$ |
| White | 1000 | Kronos 1000 | 13463-67-7 | | titanium dioxide |
| Brown | Brown 10P850 | Yellow 164 | | Shepherd | Manganese Antiomony Titanium Buff Rutile |
| Yellow | Nubifer Y-7050 | | | Nubiola/Ferro | iron oxides |
| Yellow | 30C236 | Brown 24 | 68186-90-3 | | Chromium antimony and titanium |

-continued

| Color | Pigment | C.I. Pigment | CAS # | Manufacturer | Pigment type |
|---|---|---|---|---|---|
| Blue | Blue 385 | Blue 28 | 1345-16-0 | Shepherd | Cobalt Aluminate Blue Spinel |
| Blue | Blue 211 | Blue 36 | 68187-11-1 | Shepherd | Cobalt Chromite Blue-Green Spinel |
| Blue | 214 | Blue 28 | 1345-16-0 | Shepherd | Cobalt and aluminum |
| Red | nubifer R-5501 | | | Nubiola/Ferro | iron oxides |
| Green | SMM Chrome oxide | | | Nubiola/Ferro | Chrome oxide |
| Green | Green 223 | Green 50 | | Shepherd | Cobalt Titanate Green Spinel |

In certain embodiments, the pigment(s) may be an organic pigment or a combination of an organic pigment and an inorganic pigment.

The compositions may further optionally include at least one surfactant. Illustrative surfactants include acetylenic diol surfactants, acetylenic alcohol surfactants, and alkyl sulfate surfactants.

The compositions may further optionally include at least one alkali metal hydroxide, alkaline-earth metal hydroxide, or a combination thereof. Illustrative hydroxides include sodium hydroxide, potassium hydroxide, lithium hydroxide, and barium hydroxide.

The composition may include other optional additives such as clays, fillers, dispersing agents, adhesion promoters, curatives, or accelerators.

In certain embodiments, the compositions do not include frit particles.

In certain embodiments, the compositions do not include organic solvents, particularly volatile organic solvents (VOCs). In other embodiments, the compositions may include a very small amount (e.g., less than 25 wt %, more particularly less than 10 wt %, based on the total weight of the aqueous composition) of VOCs.

In certain embodiments, the compositions do not include any dyes.

A further decorative coating application the glass industry is acid etching glass resulting in a visual satin or frost appearance that is semi-transparent or translucent. A large portion of the acid etching of glass is processed outside of the U.S. due to government regulations of working with large quantities of hazardous materials. The water-based silicates disclosed herein can provide a similar satin or frost appearance primarily by replacing the color pigment with an appropriate additive such as aluminum oxide, ceramic microspheres, recycled ground glass, calcium carbonate, or a mixture thereof.

The amount of the various components present in the compositions may vary. In certain embodiments, the silicate(s) is present in the composition in an amount of 10 to 75 wt %, more particularly 10 to 50 wt %, and most particularly 10 to 30 wt %, based on the total weight of the aqueous composition. In certain embodiments, the at least one pigment or additive is present in the composition in an amount of 1 to 50 wt, more particularly 1 to 40 wt % solids, and most particularly 10 to 30 wt %, based on the total weight of the aqueous composition. In certain embodiments, the alkali metal hydroxide or alkaline-earth metal hydroxide (if present) is present in the composition in an amount of 0.2 to 4 wt %, more particularly 0.2 to 3 wt %, and most particularly 0.2 to 2 wt %, based on the total weight of the aqueous composition. In certain embodiments, the surfactant (if present) is present in the composition in an amount of 0.001 to 1.5 wt %, more particularly 0.005 to 1.0 wt %, and most particularly 0.01 to 0.08 wt %, based on the total weight of the aqueous composition.

The compositions may be made by mechanically mixing together (e.g., via milling) the components at room temperature. The composition may also be filtered to obtain the desired particle size. For example, the composition may be passed through at least one absolute filter (e.g., 20 µm, 5 µm and/or 1 µm).

In certain embodiments, the particles in the composition (e.g., pigment particles) have an average diameter of less than 10 µm, more particularly less than 5 µm, and most particularly less than 1 µm. Small particle size is important for reducing nozzle clogging in small diameter print heads.

The pigment particles in the composition may settle out of suspension over time, and thus the print head may be associated with an ink circulation system to minimize pigment drop-out. The size of the pigments and the viscosity of the composition may be adapted such that a settling velocity of the pigments is exceeded. The composition may sediment one or several times, however the composition resumes its original structure and pigment distribution by stirring, circulating or oscillating the ink.

In certain embodiments, the viscosity of the composition is such that the composition can be discharged from an inkjet head, especially a printer head utilizing a piezoelectric transducer to drive the ink in a controlled way for digital printing or full coverage coating. For example, the composition may have a viscosity of less than or equal to 300 cP, more particularly less than or equal to 250 cP, even more particularly less than or equal to 75 cP, and most particularly less than or equal to 30 cP. In certain embodiments, the composition may have a viscosity of 15 cP to 30 cP, more particularly 10 cP to 25 cP, and most particularly 2 cP to 20 cP. The viscosity is measured on a Brookfield RVDV-11+PX viscometer using spindle 00S at 100 rpm.

The composition is heat curable. During curing, water is removed from evaporation to promote a condensation reaction to bind the silicate particles to themselves, to the surface of the glass or ceramic and bind and encapsulate pigments and other solid additives within the silicate resin. Curing temperature can depend on substrate requirements. For example, tempering glass requires 620 to 700° C. and will also cure the applied silicate coating. However, a temperature as low as 350° C., or 170° C. in some embodiments, will provide acceptable cure Illustrative glass substrates to which the compositions disclosed herein may be applied to include architectural components such as first, second, third or fourth surface of an insulated glass unit (IGU) for commercial, industrial or residential buildings and homes; automotive glass, including both laminated and non-laminated; appliance glass; furniture glass; interior wall glass; shower divider glass; and door glass. Glass substrates would include both tempered and non-tempered and annealed glass with thicknesses ranging from 1 mm to 12 mm. Illustrative types of glass include silica oxide, silicates, phosphates, and borosilicates.

Illustrative ceramic substrates include architectural components such as flooring, roofing and walls for both exterior and interior surfaces. Illustrative types of ceramic include alumina, silicon nitride, silicon carbide, zirconia, beryllium oxide, glass-ceramics, boron carbide, silicon carbides, tungsten carbides, porcelain, carbon, graphites, composites and ceramic fibers.

In certain embodiments, the thickness of the composition disposed on the substrate (after curing) may range from 1 to 100, more particularly from 2 to 50, and most particularly from 2 to 12, μm. In certain embodiments, the thickness of the composition disposed on the substrate (after application but prior to curing) may range from 2 to 200, more particularly from 4 to 100, and most particularly from 4 to 25 μm.

A large portion of the commercial and industrial inkjet printers use the piezoelectric print head technology. A piezoelectric crystal material (generally called "PZT" for lead zirconate titanate) in an ink-filled chamber behind each nozzle is used to eject ink drops. When a voltage is applied, the piezoelectric material changes shape, which generates a pressure pulse in the fluid forcing a droplet of ink from the nozzle. This type of piezo print head is known as drop-on-demand (DOD). Other alternative piezo based print heads can offer multiple drop-on-demand (MDOD) and can allow for higher viscosities as well as larger solid particle size components within the silicate resin. Piezo print heads can offer a wide variety of inks and are able to handle high viscosity ink. Piezo print heads are by several producers classified as small, medium and large print heads depending on the nozzle and drop size. A small print head may have a nozzle opening with a diameter of about 20 micron and may fire drops of 10-20 picolitres. Medium and large print heads have nozzle opening within the range of 30-40 microns and may fire drops of 20-100 picolitres. Cp or mPas is generally used to define the viscosity of ink-jet inks. One cp is equal to one mPas. Piezo print heads may handle inks with a viscosity of a few cp to more than 50 cp. Recently, industrial flat bed printers have been developed with an ink circulation system reducing the risk that the ink dries in the nozzle opening when the print head is not active.

The aqueous compositions disclosed herein are suitable for ink-based digital printing. "Variable data lithography printing," or "ink-based digital printing," or "digital offset printing," and "analog transducer driven printing", as these terms may be used throughout this disclosure, refer to lithographic printing of variable image data for producing images on a substrate that are changeable with each subsequent rendering of an image on the substrate in an image forming process. "Variable data lithographic printing" includes offset printing of ink images using lithographic ink where the images are based on digital image data that may vary from image to image. Ink-based digital printing uses a variable data lithography printing system, or digital offset printing system. A "variable data lithography system" is a system that is configured for lithographic printing using lithographic inks and based on digital image data, which may be variable from one image to the next.

The inkjet method is not particularly limited and may be of any known system, for example, a charge control system of ejecting an ink utilizing an electrostatic attraction force, a drop on demand system of utilizing a vibration pressure of a piezo element (pressure pulse system), an acoustic inkjet system of converting electric signals into acoustic beams, irradiating them to an ink, and ejecting the ink utilizing a radiation pressure, and a thermal inkjet system of heating an ink to form bubbles and utilizing the resultant pressure (BUBBLEJET®).

In certain embodiments, a pressure generation unit (for example, piezo element) using the pressure pulse method is used, the pressure generation unit is driven to control an amount of change in volume within each pressure chamber and thereby the droplet diameter of the ink composition to be ejected from the nozzle is changed to eject the ink composition from the nozzle; and a method where the pressure generation unit is driven many times, to thereby control the number of droplets ejected from the nozzle, and plural droplets are combined before landing.

The inkjet head used in the inkjet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal inkjet type, BUBBLE-JET® type, etc.), an electrostatic attraction system (for example, electric field control type, and slit jet type, etc.), and an electric ejecting system (for example, spark jet type, etc.) and any of the ejection systems may be used.

In certain embodiments, the image forming method includes, after the ink applying step, a heating fixing step for heating and fixing the ink image formed by the application of the ink composition by placing the image in contact with a heated surface. By adding a heating fixing treatment, fixing of the image on the recording medium is achieved, and the resistance of the image to abrasion and water soaking can be further enhanced.

The heating method is not particularly limited, but methods of non-contact drying such as a method of heating with a heat generator such as a nichrome wire heater; a method of supplying warm air or hot air; and a method of heating with a halogen lamp, an infrared lamp or the like, may be suitably exemplified. The method of heating is not particularly limited, but methods of performing heating and fixing by contact such as, for example, a method of pressing a heat plate to the image-formed surface of the recording medium, and a method of passing the image through a pair of rollers using a heating and pressing apparatus equipped with a pair of heating and pressing rollers, a pair of heating and pressing belts, or a heating and pressing belt disposed on the side of the image-recorded surface of the recording medium and a retaining roller disposed on the opposite side.

In certain embodiments, after the ink composition is applied to a substrate the composition-bearing substrate is subjected to a tempering process.

EXAMPLES

Examples of illustrative pigment-containing compositions are shown below. These example were made by mixing the ingredients together at room temperature. The amounts shown are parts-by-weight.

LithiSil® 25 is an aqueous lithium silicate.
LithiSil® 829 is an aqueous potassium/lithium silicate.
K6 is an aqueous potassium silicate.
BW 50 is an aqueous sodium silicate.
Niaproof 08 is sodium ethylhexyl sulfate anionic surfactant.
Black 444 is a black pigment with a copper, iron and manganese composition.
V-782 is a black pigment.
Star Silicate is an aqueous sodium silicate.

| | | | |
|---|---|---|---|
| Star Silicate | 20 | 44.5 | 18 |
| LithiSil 25 | 2 | 2 | 2 |
| LithiSil 829 | 20 | 25.6 | 18 |
| Black 444 | 35 | 22.2 | 19 |
| KOH | | 1.7 | 1 |
| H2O | 85 | 6 | 36 |
| Niaproof 08 | | 0.04 | |

Examples of illustrative satin or frost appearance compositions are shown below. These example were made by mixing the ingredients together at room temperature. The amounts shown are parts-by-weight.

| | | | |
|---|---|---|---|
| K6 | 50 | 25 | 25 |
| LithiSil 829 | 50 | — | — |
| BW 50 | — | 16 | 16 |
| Niaproof 08 | 0.2 | — | — |
| Aluminum oxide | 1 | 6 | 3 |
| Sodium or potassium hydroxide | 2 | — | — |
| H2O | >25 | >15 | >5 |

In view of the many possible embodiments to which the principles of the disclosed processes, compositions and substrates may be applied, it should be recognized that the illustrated embodiments are only preferred examples of the invention and should not be taken as limiting the scope of the invention.

What is claimed is:

1. A method comprising:
    digital printing a heat curable aqueous composition onto a substrate, wherein the composition comprises:
    (a) at least one water soluble synthetic alkali metal silicate;
    and (b)(i) at least one pigment or (b)(ii) at least one additive selected from aluminum oxide, ceramic microspheres, recycled ground glass, or calcium carbonate, wherein the composition is substantially free of any organic solvent; and
    heating the composition bearing substrate thereby curing the composition,
    wherein the substrate comprises a material selected from glass, ceramic, textile, polymeric, metal, wood, or a combination thereof.

2. The method of claim 1, wherein the substrate comprises glass, ceramic, or a combination thereof.

3. The method of claim 2, further comprising heating the composition bearing substrate at 100 to 800° C.

4. The method of claim 2, wherein the composition comprises:
    (a) 10 to 75 wt % of the at least one water soluble synthetic alkali metal silicate, based on the total weight of the aqueous composition;
    (b) 1 to 50 wt % of the at least one pigment, based on the total weight of the aqueous composition;
    (c) at least one least one alkali metal hydroxide, alkaline-earth metal hydroxide, or a combination thereof; and
    (d) at least one surfactant.

5. The method of claim 1, wherein the digital printing comprises ejecting the composition from a piezo printing head.

6. The method of claim 5, further comprising circulating the composition thru an ink circulation system associated with the piezo printing head.

7. The method of claim 1, wherein the composition further comprises at least one alkali metal hydroxide, alkaline-earth metal hydroxide, or a combination thereof.

8. The method of claim 1, wherein the composition further comprises at least one surfactant.

9. The method of claim 8, wherein the surfactant is selected from acetylenic diol surfactants, acetylenic alcohol surfactants, and alkyl sulfate surfactants.

10. The method of claim 1, wherein component (a) is selected from sodium silicate, lithium silicate, potassium silicate, or a mixture thereof.

11. The method of claim 1, wherein the pigment is a mixed metal oxide pigment.

12. The method of claim 1, wherein the at least one water soluble synthetic alkali metal silicate is present in the composition in an amount of 10 to 75 wt %, based on the total weight of the aqueous composition.

13. The method of claim 1, wherein the at least one pigment is present in the composition in an amount of 1 to 50 wt %, based on the total weight of the aqueous composition.

14. The method of claim 1, wherein the composition is substantially free of any dye.

15. The method of claim 1, wherein the composition includes at least one pigment.

16. The method of claim 1, wherein the composition includes at least one additive selected from aluminum oxide, ceramic microspheres, recycled ground glass, or calcium carbonate.

17. The method of claim 1, wherein the digital printing comprises ejecting the composition from a thermal printing head.

18. The method of claim 1, wherein the composition comprises at least one pigment in the form of pigment particles, and the particles have an average diameter of less than 10 μm.

19. The method of claim 1, wherein the composition has a viscosity less than or equal to 30 cP.

20. The method of claim 1, wherein the composition has a viscosity of 10 cP to 25 cP.

21. The method of claim 1, wherein the composition has a viscosity of 2 cP to 20 cP.

22. A method comprising:
    ejecting the composition from a piezo printing head and onto a substrate, wherein the composition comprises
    (a) at least one water soluble synthetic alkali metal silicate; and
    (b)(i) at least one pigment or (b)(ii) at least one additive selected from aluminum oxide, ceramic microspheres, recycled ground glass, or calcium carbonate, wherein the composition is substantially free of any organic solvent; and
    heating the composition bearing substrate thereby curing the composition,
    wherein the substrate comprises a material selected from glass, ceramic, textile, polymeric, metal, wood, or a combination thereof.

23. The method of claim 22, wherein the substrate comprises glass, ceramic, or a combination thereof, and the composition comprises:
    (a) 10 to 75 wt % of the at least one water soluble synthetic alkali metal silicate, based on the total weight of the aqueous composition;
    (b) 1 to 50 wt % of the at least one pigment, based on the total weight of the aqueous composition;
    (c) at least one least one alkali metal hydroxide, alkaline-earth metal hydroxide, or a combination thereof; and
    (d) at least one surfactant.

24. The method of claim 22, wherein the composition comprises at least one pigment in the form of pigment particles, and the particles have an average diameter of less than 10 μm.

25. The method of claim 22, wherein the composition has a viscosity less than or equal to 30 cP.

26. A method comprising:
digital printing a heat curable aqueous composition onto a substrate, wherein the composition comprises:
(a) 10 to 75 wt % of at least one water soluble synthetic alkali metal silicate, based on the total weight of the aqueous composition; and
(b)(i) at least one pigment or (b)(ii) at least one additive selected from aluminum oxide, ceramic microspheres, recycled ground glass, or calcium carbonate; wherein the composition is substantially free of any organic solvent; and
heating the composition bearing substrate thereby curing the composition,
wherein the substrate comprises a material selected from glass, ceramic, textile, polymeric, metal, wood, or a combination thereof.

27. The method of claim 26, wherein the composition has a viscosity less than or equal to 30 cP.

28. The method of claim 26, wherein component (a) is selected from sodium silicate, lithium silicate, potassium silicate, or a mixture thereof.

29. A method comprising:
ejecting a composition from a piezo printing head and onto a substrate, wherein the composition comprises
(a) 10 to 75 wt % of at least one water soluble synthetic alkali metal silicate, based on the total weight of the aqueous composition; and
(b)(i) at least one pigment or (b)(ii) at least one additive selected from aluminum oxide, ceramic microspheres, recycled ground glass, or calcium carbonate; wherein the composition is substantially free of any organic solvent; and
heating the composition bearing substrate thereby curing the composition,
wherein the substrate comprises a material selected from glass, ceramic, textile, polymeric, metal, wood, or a combination thereof.

30. The method of claim 29, wherein the composition has a viscosity less than or equal to 30 cP.

* * * * *